H. GILLAR & S. W. CROUSE.
CUTTING OFF MACHINE FOR TAFFY OR THE LIKE.
APPLICATION FILED JUNE 12, 1918.

1,296,647.

Patented Mar. 11, 1919.
2 SHEETS—SHEET 1.

INVENTORS
Henry Gillar and
Samuel W. Crouse
BY Dyke & Campfield
ATTORNEYS

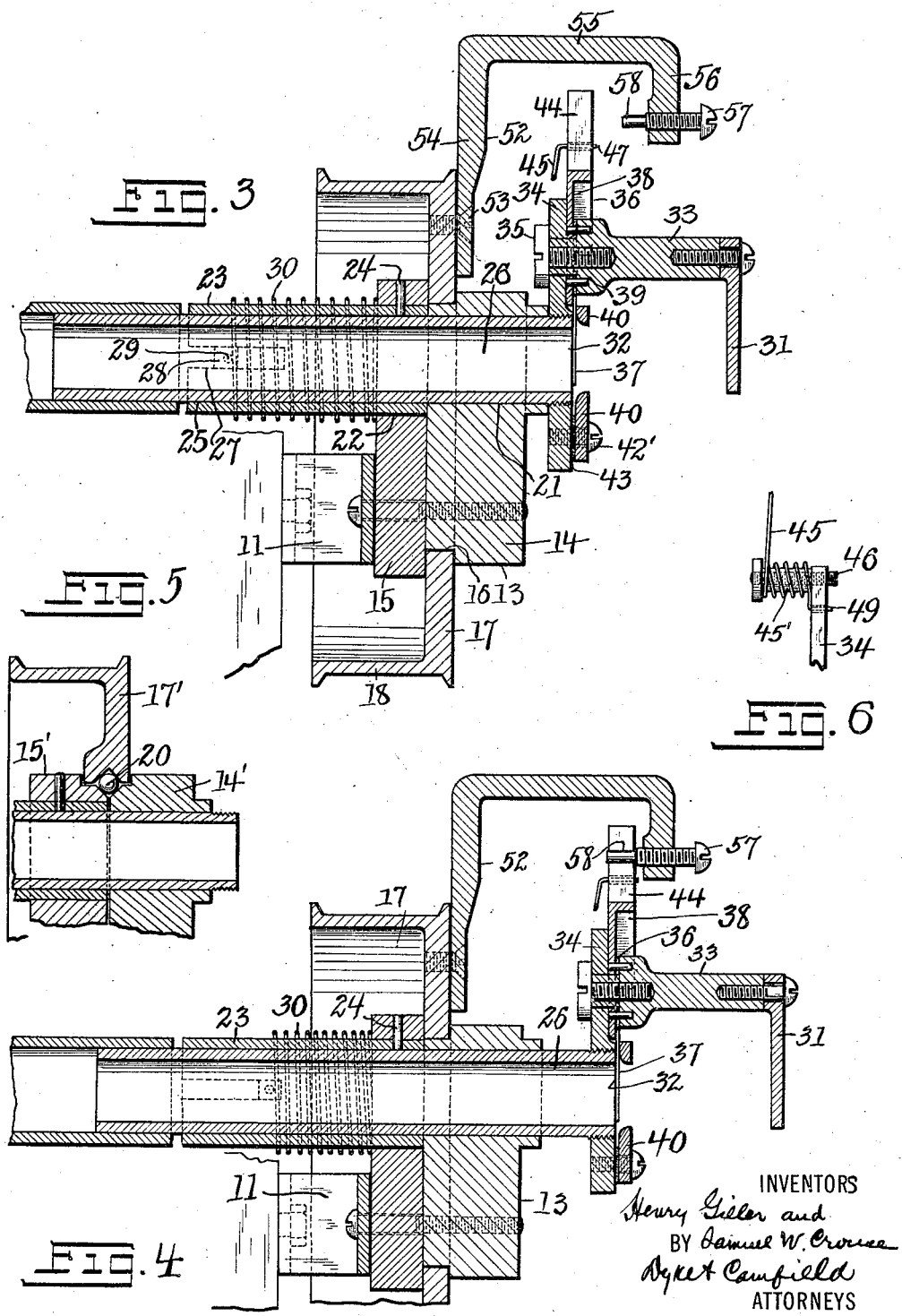

UNITED STATES PATENT OFFICE.

HENRY GILLAR AND SAMUEL W. CROUSE, OF SOUTH RIVER, NEW JERSEY.

CUTTING-OFF MACHINE FOR TAFFY OR THE LIKE.

1,296,647.  Specification of Letters Patent.  Patented Mar. 11, 1919.

Application filed June 12, 1918. Serial No. 239,622.

*To all whom it may concern:*

Be it known that we, HENRY GILLAR and SAMUEL W. CROUSE, citizens of the United States, and residents of South River, county of Middlesex, and State of New Jersey, have invented certain new and useful Improvements in Cutting-Off Machines for Taffy or the like, of which the following is a specification.

This invention relates to a machine for cutting off pieces of taffy or the like material of substantially uniform length as the same is continuously produced or fed forward in the form of a continuous rod or the like from mechanism suitably arranged or constructed for such purpose, or otherwise fed into the apparatus.

The machine of the present invention is not concerned with the production of the taffy or other material in the form of a continuously formed rod or the like, but is adapted for cutting uniform lengths from the same as fed forward by any suitable means.

The object of the invention is the provision of an apparatus adapted for performing the functions above referred to, and it is a further object of the invention to effect the improvement of apparatus of this character in a number of important respects, and with the foregoing and related objects in view, our invention consists in the parts, elements, features of construction and combinations herein set forth and claimed.

Figure 1:
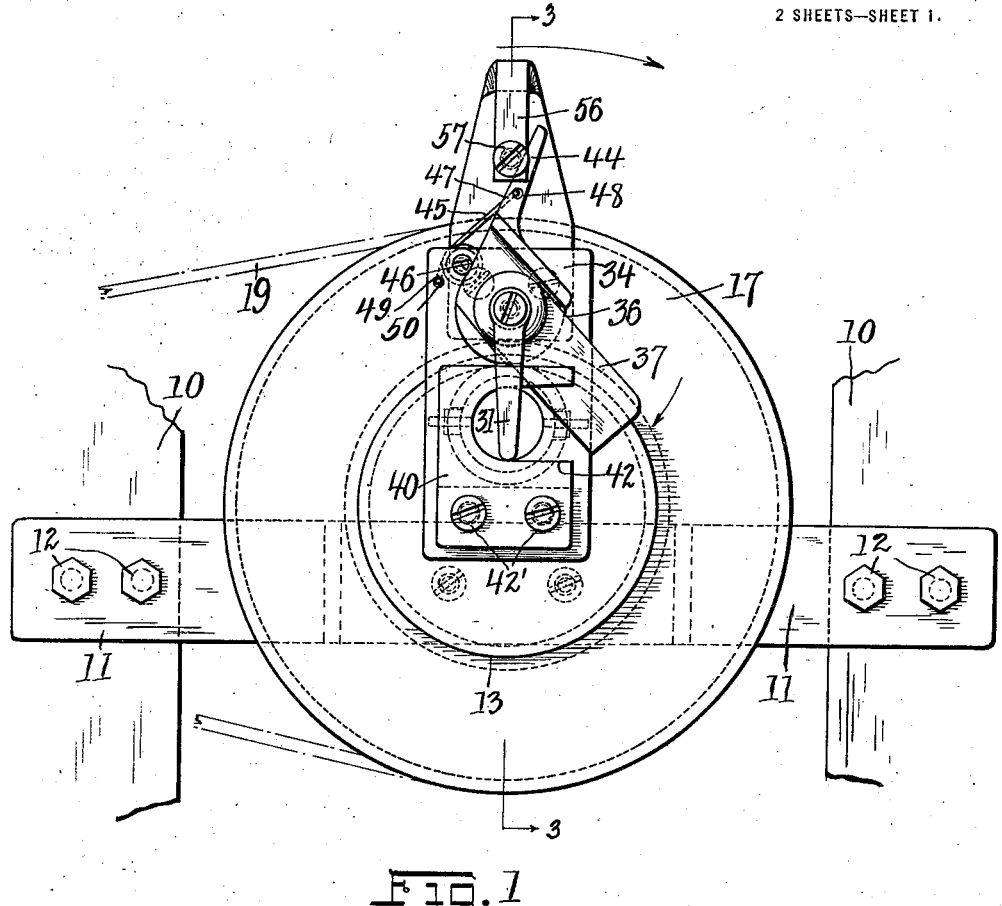
Figure 2:
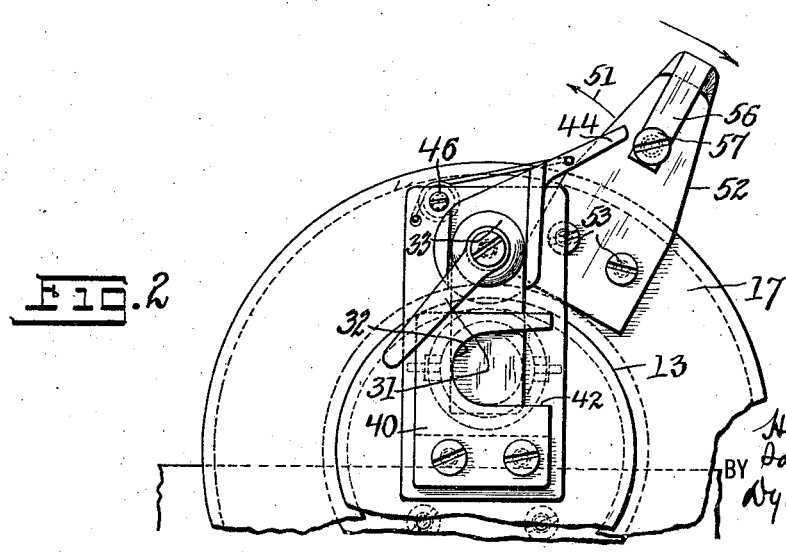

In the accompanying drawings, forming a part of this specification and wherein the same reference characters are uniformly used to designate the same parts throughout, Figure 1 is a front view of a taffy cutting machine embodying our invention. Fig. 2 is a fragmentary view similar to Fig. 1, but showing the parts in a different position. Fig. 3 is a central, vertical, sectional view, taken on the line 3, 3, Fig. 1. Fig. 4 is a similar view, but showing the parts in a different position. Fig. 5 is a sectional detail view of a modified form of bearing, and Fig. 6 is a fragmentary detail view of a spring and its mounting.

In said drawings, reference numeral 10 designates a fixed support, as a part of a machine frame. A bar or bracket 11 is secured to the support 10 by means of bolts 12. To this bracket is secured a journal block, indicated generally by the reference numeral 13, and comprising, in the form shown, two parts 14 and 15. A groove 16 is formed in the block 13 and serves as a journal bearing for the rotary member 17. Such rotary member may be of any form and driven in any manner, but as shown, such member has the form of a belt pulley and is provided with a grooved face 18 for reception of the driving belt 19. In the form shown in Fig. 3, the member 17 has a plain bearing on the journal block, but various forms of anti-friction bearing may be resorted to, as, for example, in the construction shown in Fig. 5, a ball bearing is illustrated, the ball race for receiving the bearing balls 20 being provided partly between the bearing block members 14' and 15' and partly within the pulley wheel 17'. The bearing block member 14 is provided with a transverse bore 21, and the bearing block member 15 is provided with an enlarged bore 22 alined with the bore 21. Within the bore 22 of the bearing block member 15 and abutting against the bearing block member 14 is a tube 23 which is fixedly secured to the block member 15, as, for example, by means of pins 24. The interior walls 25 of the tube 23 form substantially a continuation of the bore 21 in the block member 14, and there is received therein the endwise slidable tube 26. Means are provided for preventing rotation of said tube 26 and at the same time permitting it to be movable longitudinally. In the form shown, the tube 23 is provided with open slots 27 which receive preferably square blocks 28, 28, which are in turn secured to the tube 26 by means of pins 29, 29.

Spring means are provided for moving the tube 26 to the left, as the same appears in Fig. 3, and such means may comprise a coil spring 30 encircling the tube 23 and bearing at one end against the block member 15 and at the opposite end against the part or parts connected with the tube 26, as, for example, against the blocks 28 or pins 29.

The portion of the slidable or non-rotatable tube 26 extending through and beyond the bearing block member 14 is provided with a cutting knife and also with means for causing longitudinal movement of the tube 26 and the parts borne thereby by engagement with material entering the tube 26 at the left (Fig. 3) and passing therethrough.

In the form shown, an arm 31 is provided opposite the mouth 32 of the tube 26, and in the form shown such arm is carried by a stub shaft 33 which is mounted to oscillate on the cross-head 34 on the end of the tube 26, being held against endwise movement by means of a screw 35. The cross-head 34 is secured to the tube 26 by being screwed thereon, but other forms of rigid attachment between the tube 26 and cross-head 34 may be resorted to, as, for example, solder or the like, which may be utilized with or without such screw thread. The cutting knife 36 is pivoted to oscillate on the cross-head 34, and in the form shown it is attached to the stub shaft 33 as by being pinned thereto by means of pins 39. The knife 36 comprises a blade 37 and a thickened lever portion 38 to which the blade 37 is secured. It will be seen that when the knife is turned, the stub shaft 33 and arm 31 turn therewith.

Suitable guard and guide means are provided for guiding and guarding the knife 36 in its action, and in the form shown the same consists of a plate 40 having a slot opening 42 therein opposite the mouth 32 of the tube 26 and secured in place by screws 42', 42', washers or spacing pieces 43 being interposed so as to space the guide 40 away from the cross-head 34 sufficiently to permit the passage of the knife blade 37 with a proper preferably slight clearance.

The knife 36 is operated by means, presently to be referred to, engaging the outwardly projecting finger 44 thereof and is returned to open position, as shown in Fig. 5, by suitable means, preferably by means of a spring 45 which may encircle a stud 45' held on the cross-head 34 by a screw 46 and having its end 47 received in an opening 48 in the finger 44, and its opposite end 49 is received in an opening 50 in the cross-head 34. The purpose of such spring is to turn the knife in the direction indicated by the arrow 51 in Fig. 2, and from the position illustrated in Fig. 2 to that illustrated in Fig. 1. Means are provided for serving as a stop to the movement of the knife 36 under the action of the spring 45, and in the form shown the screw 46 is utilized for the purpose of performing this function, the movement of the knife 36 under the action of the spring 45 being terminated when the lever portion 38 thereof comes in contact with the screw 46, as illustrated in Fig. 1.

It will be seen that as material to be cut, such as a continuously formed rod or the like of taffy or the like, is fed through the tube 26 from its left hand end (Fig. 3), it passes the open end 32 thereof, the knife 36 being normally maintained by the spring 45 in the open position shown in Fig. 1, and after passing the mouth 32 of the tube 26, the end of the stick or rod of taffy or other material to be cut encounters the arm 31, whereupon the arm 31 and all the attached parts, including the knife 36 and tube 26, are moved along with the material.

Means are provided for operating the knife 36 and arm 31 by contacting with the finger 44 only when the tube 26 and connected parts have been moved by the material, including the arm 31, to a sufficient distance. Such operating means are connected with the rotating member 17. In the form shown, a substantially U-shaped arm 52 is secured to the member 17, as by means of screws 53, and the same comprises an outwardly extending radial portion 56, and the portion 56 carries preferably adjustable means for contacting with the finger 44 and operating the knife 36 and turning the stub shaft 33 and arm 31. In the form shown, a screw 57, screwed in the arm 56, is provided for this purpose, and the end thereof, which extends backward toward the member 54, and which is designated by the reference numeral 58, serves as the means for striking the finger 44, but it will be observed that the rotatable member 17 may turn freely, and with it the bracket and striker 57, until the tube 26 has been carried sufficiently to the right to cause the finger 44 to be actuated by the inturned striking member, which, in the form shown, is the inwardly projecting end 58 of the screw 57.

It will be seen that cutting means such as disclosed are simple and effective and certain in operation, the material to be cut being fed along under continuous pressure, as from an extruding machine, into the open ended tube 26 at the left hand end thereof, as shown in Fig. 3, and passing therefrom and out the open end 32 and contacting with the arm 31, whereby all the parts connected with the tube 26 are moved longitudinally, and that the rotating member 17 turns freely until such parts, including the finger 44, have moved sufficiently so that the striker 58 contacts with the finger 44 during the rotation of the member 17, whereupon the knife is operated to cut off a piece of the material and immediately retreats under action of the spring 45. At the same time the arm 31 is moved to the position shown in Fig. 2 and retreats again to the position shown in Fig. 1, the first movement of the arm 31 freeing the cut off piece and the second or rapid return movement of the arm 31, under the influence of the spring 45, knocking the cut off piece out of the way, if same has not already been delivered by gravity. The pressure on the arm 31 being released by the cut off portion having been severed, the tube 26, under the action of the spring 30, retreats, moving the finger 44 from position where contact with the striker 57 is made, and as soon as the new end of the material encounters the arm 31, the parts mounted on the tube 26 are again carried to the right, whereupon a new piece is cut off and delivered, and such action is continued indefinitely.

It is to be understood that the embodiment shown is for illustration only, and not for limitation of the invention, and that modifications and changes may be resorted to within the scope of our claims and without departing from the invention or sacrificing its advantages.

We claim:

1. In a cutting off apparatus, a slidable conduit through which material to be cut off may be fed, means connected with said conduit and interposed in the path of material passing beyond the mouth of the conduit whereby the conduit is slidably moved by material passing therethrough, and cutting off means brought into operation by the movement of the conduit for cutting off such material when the conduit reaches a predetermined position.

2. In cutting off apparatus, cutting off means adapted to be moved with the material to be cut off, means whereby said cutting off means is moved along by the advancing material only, and rotatable actuating means for said cutting off means normally rotating freely and adapted to operate said cutting off means when the latter reaches a predetermined position.

3. In cutting off apparatus, a slidable tube through which material to be cut off may be fed, a knife on said tube, spring means for forcing the knife to one side of the tube, and rotatable means in the path of said knife for actuating same against said spring means and thereby cutting off pieces of material.

4. In cutting off apparatus, a slidable tube, a spring-pressed knife thereon and having an operating lever, and means rotatable about said tube for actuating said knife when the knife reaches a predetermined position.

5. In cutting off apparatus, a slidable tube, an arm carried thereby in advance of the mouth of the tube, and means adapted for cutting off material projecting from said tube, said means being adapted to be brought into operation by contact of the projecting material with said arm.

6. In cutting off apparatus, a rotatable member, an arm thereon extending away from and backwardly toward the rotary member, a conduit for material to be cut off extending through said rotary member, and means on said conduit and between the rotary member and the backwardly extending portion of the arm for cutting off material projecting beyond the conduit, said cutting off means being adapted to be moved into contact with and operated by the backwardly extending portion of the rotating arm.

7. In cutting off apparatus, cut off means mounted to have a movement of translation, rotating means for actuating said cut off means, said rotating means being normally in advance of the cut off means and becoming operative only when the cut off means is brought into engagement therewith by its translatory movement.

8. In apparatus for cutting off pieces of taffy or the like, a bearing block, a slidable tube extending therethrough, a spring means for retracting said tube, means connected to said tube and extending into the path of material passing therethrough whereby the tube is adapted to be moved by the material to be cut off, a cross-head on said tube, a pivoted knife on said cross-head, spring means for forcing said knife into open position, a rotatable member on the bearing block, and means on said rotatable member for contacting with and operating said knife against the action of said spring to cut off material projecting beyond the tube when the tube is fed forward by material passing therethrough.

9. In cutting off apparatus, a slidable member having a bore therein, means sliding with said member and normally located opposite the end of the bore for imparting movement from material passing through and out of said bore to the said member, a knife on the slidable member, and means for simultaneously operating said knife and moving said movement imparting means from position opposite the end of the bore.

In testimony that we claim the foregoing, we hereto set our hands, this 7th day of June, 1918.

HENRY GILLAR.
SAMUEL W. CROUSE.